United States Patent

Kawanami et al.

Patent Number: 5,119,456
Date of Patent: Jun. 2, 1992

[54] OPTICAL FIBER CONNECTOR TERMINAL AND METHOD OF MAKING SAME

[75] Inventors: Norihide Kawanami; Kinjiro Okada, both of Tokyo; Yoshikazu Kozu, Ueda, all of Japan

[73] Assignee: Hirose Electric Co., Ltd., Tokyo, Japan

[21] Appl. No.: 659,077

[22] Filed: Feb. 22, 1991

[30] Foreign Application Priority Data

May 16, 1990 [JP] Japan .................................. 2-124015

[51] Int. Cl.⁵ .............................................. G02B 6/26
[52] U.S. Cl. ......................................... 385/81; 385/82; 385/80; 385/84; 385/85
[58] Field of Search ............... 350/96.20, 96.21, 96.22, 350/96.23, 320; 385/81, 82, 84, 85, 62, 64, 66

[56] References Cited

U.S. PATENT DOCUMENTS

| | | | |
|---|---|---|---|
| 4,099,832 | 7/1978 | Warner, Jr. | 385/64 |
| 4,183,619 | 1/1980 | Makuch | 385/82 |
| 4,184,741 | 1/1980 | Hawk et al. | 385/82 |
| 4,201,443 | 5/1980 | Hodge | 385/82 |
| 4,397,522 | 8/1983 | Parr | 385/82 |
| 4,448,482 | 5/1984 | Lathlaen | 385/64 |
| 4,593,971 | 6/1986 | Clement et al. | 385/64 |
| 4,614,401 | 9/1986 | Strait, Jr. | 385/82 |
| 4,668,045 | 5/1987 | Melman et al. | 385/82 |
| 4,725,118 | 2/1988 | Serrander | 385/82 |
| 4,773,725 | 9/1988 | Ashman et al. | 385/82 |
| 4,902,090 | 2/1990 | Tanaka et al. | 385/81 |

Primary Examiner—Brian Healy
Attorney, Agent, or Firm—Kanesaka & Takeuchi

[57] ABSTRACT

An optical fiber connector terminal includes a sleeve (6); a plurality of pins (7) disposed equidistance from a center within the sleeve to form a receiving aperture (9); a plurality of inner ridges (8) disposed between the sleeve and the pins; and an optical fiber (10) inserted into and bonded to the receiving aperture.

10 Claims, 5 Drawing Sheets

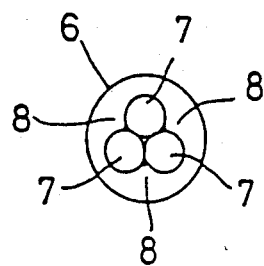
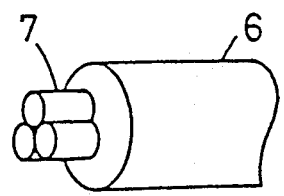
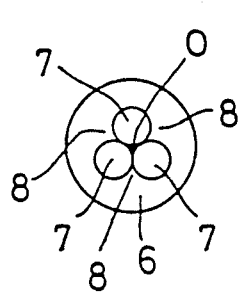
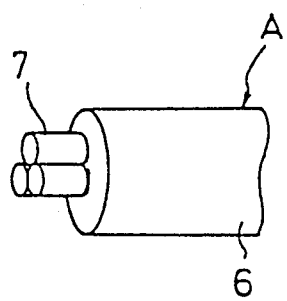
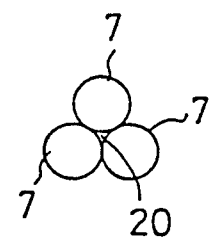
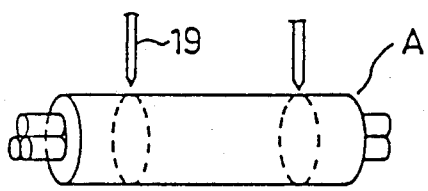
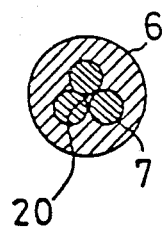
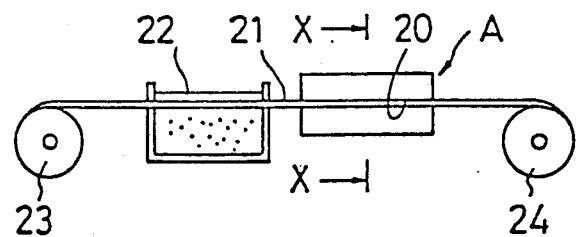
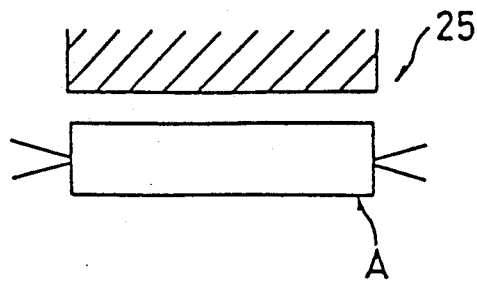

OPTICAL FIBER CONNECTOR TERMINAL AND METHOD OF MAKING SAME

BACKGROUND OF THE INVENTION

1. Field of the Invention

The present invention relates to optical fiber connector terminals for closely connecting cords or cables of optical fibers within an adapter for communications systems, data transmission systems, and other optical systems.

2. Description of the Prior Art

In optical fiber transmission lines, the connection between optical fibers is critical. The connection of optical fibers requires a precise registration of optical fibers. Optical fibers are made from glass and have a diameter of 100 microns. There are two requirements for the connector terminals; protecting and reinforcing the optical fibers and registering optical fibers with high-precisions in the order of micrometers.

In an attempt to satisfy such requirements, an optical fiber connector terminal such as shown in FIG. 24 has been proposed. This connector terminal includes a terminal body 40 which is made from zirconia ceramic. The terminal body 40 is made by molding a terminal body which is slightly larger than the finished product, sintering it at high temperatures, and grinding a receiving aperture 41 with a wrapping wire or the like to the desired size. The terminal body 40 is then press fitted into a support member 42.

However, it is very difficult to make a long core pin of the mold for the receiving aperture 41 so that it is very difficult to make a thin long receiving aperture 41 which is longer than 10 mm. For this reason, the strength of an optical fiber bonded to the conventional receiving aperture 41 is so small that the finished product is not reliable.

The zirconia ceramic materials require sintering at high temperatures, making the manufacturing process complex and difficult, resulting in the low yield. In addition, thin connector terminals between 1.0 and 1.5 mm in diameter have low bending resistance and are easy to break upon connection and disconnection.

Even if the connector terminal is made from a metal, it is extremely difficult to make a thin long receiving aperture in the connector terminal. Moreover, the terminal body 40 and the support member 42, which are made from different materials, are not compatible and can break upon forcible connection.

SUMMARY OF THE INVENTION

Accordingly, it is an object of the invention to provide an optical fiber connector terminal having a fine long aperture in which an optical fiber is bonded, thereby providing a reliable optical fiber connector terminal.

It is another object of the invention to provide a method of making such an optical fiber connector terminal as described above.

According to an aspect of the invention there is provided an optical fiber connector terminal which includes a sleeve; a plurality of pins disposed equidistance from a center within the sleeve to form a receiving aperture; a plurality of inner ridges disposed between the sleeve and the pins; and an optical fiber inserted into and bonded to the receiving aperture.

In the above connector terminal, the sleeve, the inner ridges, and the pins are integrated so that the pins are fixed to provide a thin long receiving aperture, thereby providing a long connector terminal. This increases the bonding strength of an optical fiber to the receiving aperture and thus the connector reliability.

According to another aspect of the invention there is provided a method of making an optical fiber connector terminal, which includes the steps of providing a plurality of inner ridges on the inside of a sleeve; placing a plurality of pins within the sleeve such that the pins are disposed around a center of the sleeve; reducing a diameter of the sleeve so that the inner ridges are collapsed to fill spaces between the sleeve and the pins, thereby disposing the pins equidistance from the center to form a receiving aperture at the center; and securing an optical fiber in the receiving aperture to provide an optical fiber connector terminal.

By the above method it is possible to make a connector terminal having a thin long receiving aperture without difficulty.

The above and other objects, features, and advantages of the invention will become more apparent from the following description when taken in conjunction with the accompanying drawings.

BRIEF DESCRIPTION OF THE DRAWINGS

FIGS. 9 and 10 show three pins and three inner ridges placed in the sleeve;

FIGS. 11-13 show a connector terminal material with a triangular aperture at the center;

FIG. 14 shows how to cut off end portions of the connector terminal material;

FIG. 15 is a cross section of the connector terminal material;

FIG. 16 illustrates how to wrap the triangular aperture to form a circular receiving aperture;

FIG. 17 shows how to grind the circumference of the connector terminal material with a cylindrical grinder;

DESCRIPTION OF THE PREFERRED EMBODIMENT

Figure 1:
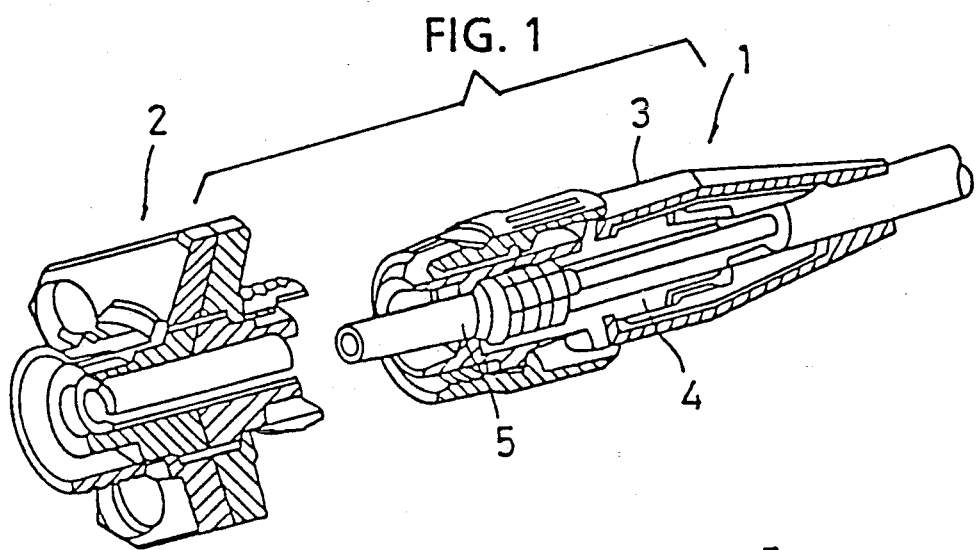
FIG. 1 is a perspective view of an optical fiber connector having a connector terminal according to an embodiment of the invention.
Figure 2:
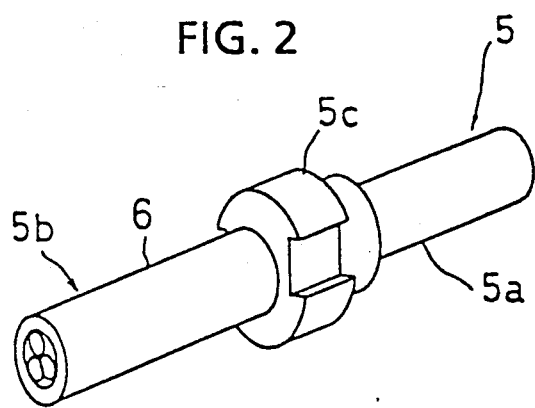
FIG. 2 is a perspective view of the connector terminal of FIG. 1.
Figure 3:
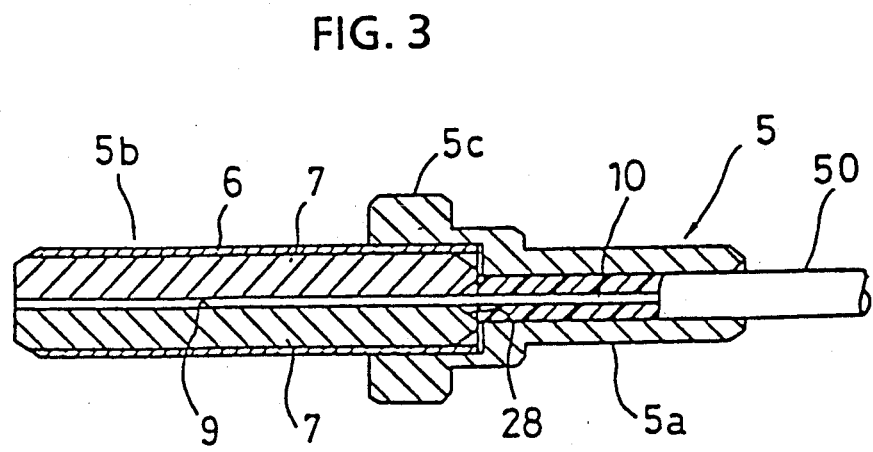
FIG. 3 is a longitudinal section of the connector terminal of FIG. 1.
Figure 4:
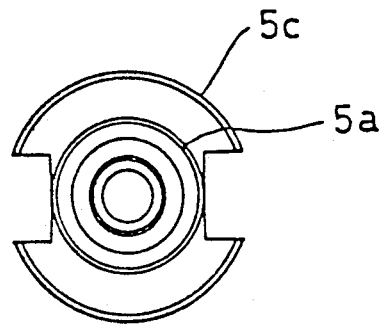
FIG. 4 is a rear view of the connector terminal of FIG. 1.
Figure 5:
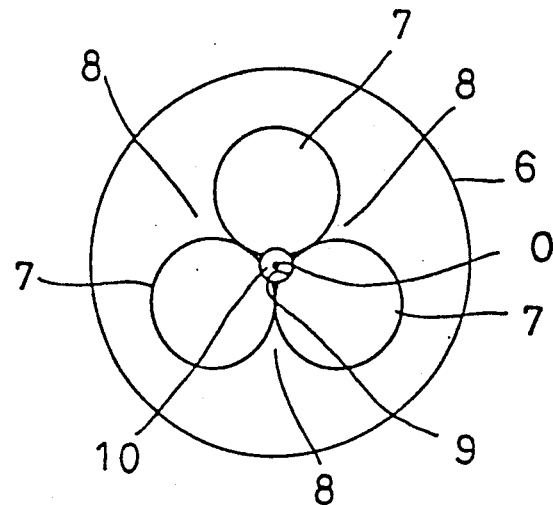
FIG. 5 is a front view of a terminal body of the connector terminal of FIG. 1.

In FIG. 1, the optical fiber connector includes a plug 1 and an adapter 2. The plug 1 has a plug housing 3 for housing an optical fiber connector terminal 5 via a retainer fixture 4.

As FIGS. 2-5 show, the connector terminal 5 consists of a support member 5a with a flange 5c and a terminal body 5b attached to the support member 5a. The terminal body 5b has a sleeve 6 in which three pins 7 are placed with three inner ridges 8 filling in spaces between the sleeve 6 and the pins 7. An optical fiber 10 of a fiber cable 50 is bonded to a receiving aperture 9 defined by the three pins 7. The sleeve 6 with the inner ridges 8 is subjected to a rotary forging process in a rotary swage, for example, to be reduced in diameter so that the inner ridges 8 fills spaces between the sleeve 6 and pins 7 while the three pins 7 are disposed equidistance from a center 0, thereby placing the optical fiber 10 at the center 0.

As has been described above, the three pins 7 are disposed equidistance from the center 0 within the sleeve 6 to form a receiving aperture 9 at the center 0. The inner ridges 8 are provided in spaces between the sleeve 6 and the pins 7, and the sleeve 6 is reduced in diameter so that the inner ridges 8 fill spaces between the sleeve 6 and the pins 7, and the optical fiber 10 is bonded in the receiving aperture 9. As a result, the sleeve 6 with the inner ridges 8 and the pins 7 are integrated to hold the pins 7 in place, thereby forming a thin long aperture 9. This makes it possible to make a long connector terminal. Consequently, the bonding strength of the optical fiber 10 to the receiving aperture 9 is increased, resulting in the increased connector reliability.

A method of making such an optical fiber connector terminal 5 will be described below with reference to FIGS. 6-21.

Figure 6:
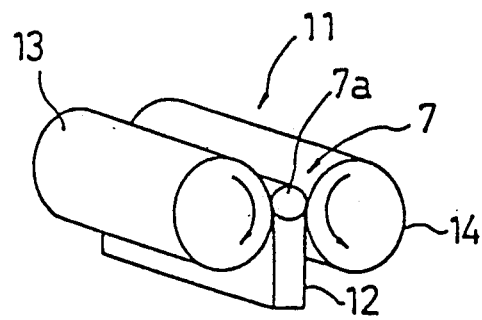
FIG. 6 is a perspective view showing how to grind a pin for making the connector terminal of FIG. 1.

In FIG. 6, a pin material 7a of stainless steel is cut to a predetermined length (for example, 60mm), subjected to a heat treatment or hardening process, and ground in a grinder 11 to form a pin 7 which has a predetermined degree of circularity and a predetermined degree of surface smoothness. The grinder 11 consists of a support member 12 for supporting the pin material 7a and a pair of grinding rollers 13 and 14, which rotate in opposite directions shown by arrows to grind the pin material 7a. Thus, the pin 7 is made from a hardened stainless steel material (for example, SUS 305).

Figure 7:
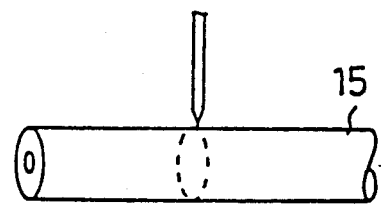
FIG. 7 shows how to cut a pipe for making a sleeve for the connector terminal of FIG. 1.

In FIG. 7, in order to make a sleeve 6, a stainless steel pipe 15 is cut to a predetermined length.

Figure 8:
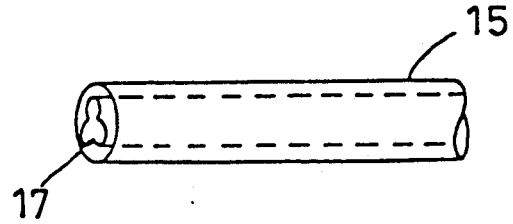
FIG. 8 shows how to make a specified inner diameter in the sleeve of FIG. 7.

In FIG. 8, this sleeve 6 is made from stainless steel by a drawing process to provide three inner ridges 8 which extend toward the center of the sleeve 6. Unlike the pin 7, the resulting sleeve 6 is made from stainless steel which is not hardened so that its hardness is less than that of the pin 7.

In FIGS. 9 and 10, three pins 7 and three inner ridges 8 are alternatingly disposed within the sleeve 6. The pins 7 are dimensioned such that they form a substantially triangular cross section, each apex of which contacts the inside of the sleeve 6.

In FIGS. 11-13, the sleeve 6 having the three pins 7 and the three inner ridges 8 therein is subjected to a rotary forging process, for example, in a rotary swage to reduce the diameter. The rotary forging process is a process by which the sleeve 6 is struck by one or two pairs of forging dies under continuous or intermittent rotation about its axis, thereby forming a connector terminal material A. The rotary forging process makes the inner ridges 8 collapse to fill spaces between the sleeve 6 and the pins 7, thereby disposing the three pins 7 equidistance from the center 0.

In FIG. 14, opposite end portions of the connector terminal material A are cut off with a pair of fine cutters 19. The cutting surfaces are smoothed and cleaned.

In FIG. 15, a receiving aperture 20 of a substantially triangle cross section is formed at the center of the three pins 7. A receiving aperture 9 of a circular cross section into which an optical fiber is to be inserted is made from the triangle aperture 20.

In FIG. 16, a wrapping wire 21 is put through the triangle aperture 20. Grindinq diamond granules 22 are put on the wrapping wire 21. A pair of reels 23 and 24 are turned back and forth to reciprocate the wrapping wire 21 to grind the wall of the receiving aperture 20.

In FIG. 17, the outside of the connector terminal material A is polished with a cylindrical grinder 25 to provide the desired degree of concentricity.

Figure 18:
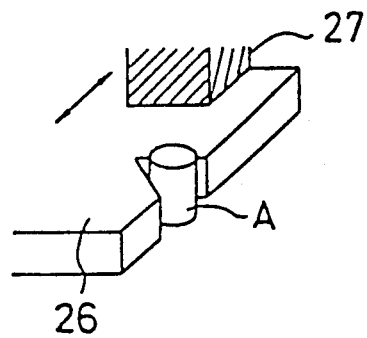
FIG. 18 illustrates how to polish an end of the connector terminal material.

In FIG. 18, an end surface of the terminal material A is polished with a grinder 27 while being held in place with a holder 26 to provide a right angled end surface.

Figure 19:
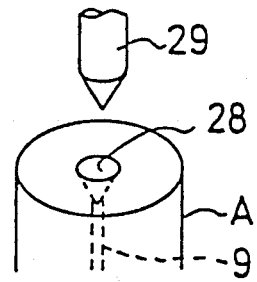
FIG. 19 shows how to make a guide surface in the receiving aperture.

In FIG. 19, a guiding surface 28 is made at an end of the receiving aperture 9 by an electric discharge process using an electrode 29. Alternatively, the guiding surface 28 may be made by a cutting process.

Figure 20:
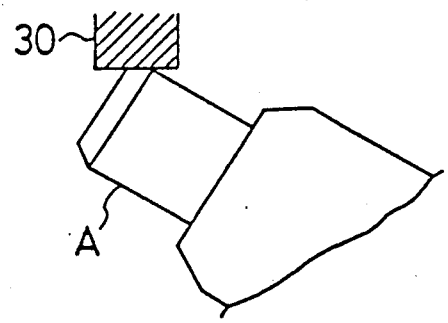
FIG. 20 illustrates how to round a corner of the connector terminal material.

In FIG. 20, an end of the terminal material A is ground with a grinder 30 to provide a rounded corner. The terminal material A is then cleaned and press fitted into a support member 5a for integration.

Figure 21:
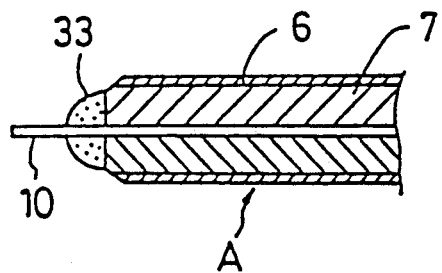
FIG. 21 is a longitudinal section of the connector terminal material in which, an optical fiber is bonded.

In FIG. 21, an adhesive 33 is put in the receiving aperture 9, and an optical fiber 10 is put through the receiving aperture 9, thereby building up the adhesive 33 at the end surface so that the projected portion of the optical fiber 10 is also bonded. The built up adhesive 33 and the projected optical fiber 10 are ground off with a grinder to provide a connector terminal 5.

Figure 22:
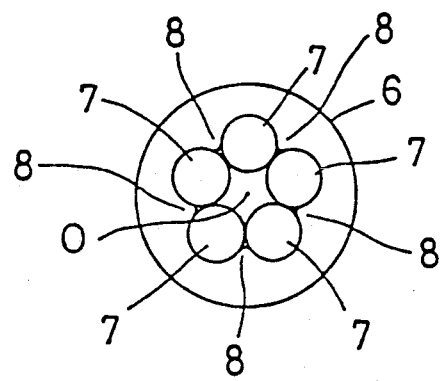
FIGS. 22 and 23 are end views of a connector terminal according to another embodiment of the invention before and after the application of a rotary forging process, respectively.
Figure 23:
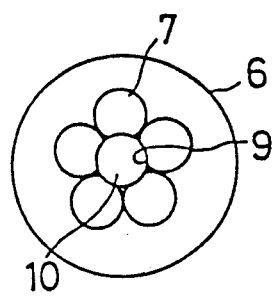
Figure 24:
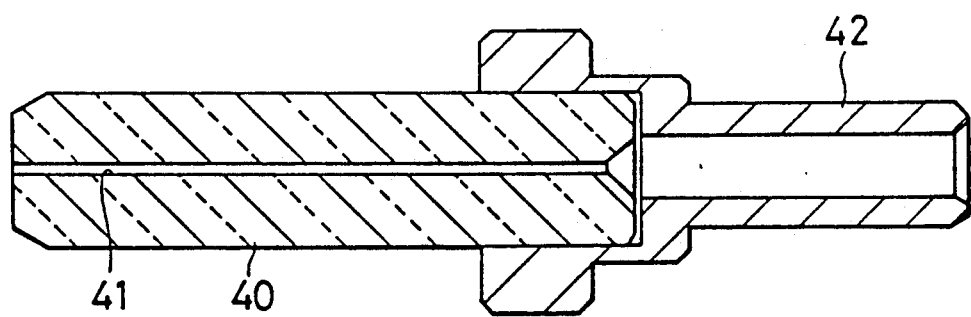
FIG. 24 is a longitudinal section of a conventional connector terminal.

FIGS. 22 and 23 show another embodiment of the invention, wherein five pins 7 and five inner ridges 8 are disposed within the sleeve 6 such that they contact the adjacent pins, the inner ridges, and the inside of the sleeve 6. An optical fiber 10 is inserted and bonded in a receiving aperture 9 defined by the five pins 7. The inner sleeve 6 with the ridges 8 is subjected to a rotary forging in a rotary swage, for example, so that the inner ridges 8 fill spaces between the sleeve 6 and the pins 7 to dispose the five pins 7 equidistance from the center 0, thereby disposing the receiving aperture 9 at the center 0 for the optical fiber 10. By using the five pins 7, it is possible to provide a connector terminal with a receiving aperture having a diameter greater than that of the three pin connector terminal.

The five pin connector terminal is made in the same way as that of the three pin connector terminal.

Alternatively, the sleeve 6 and the inner ridges 8 made from stainless steel which is not hardened may be made from tungsten or beryllium as far as their hardness is less than that of the pins 7 which are made from hardened stainless steel such as SUS 305. The sleeve 6 having the pins 7 and the inner ridges 8 were reduced in diameter by a rotary forging in a rotary swage in the above embodiment, but the same results may be obtained by a drawing or press machine.

We claim:

1. An optical fiber connector terminal comprising:
a sleeve;
a plurality of pins disposed equidistance from a center within said sleeve to define a receiving aperture;
a plurality of inner ridges disposed between said sleeve and said pins; and
an optical fiber inserted into and bonded to said receiving aperture
said sleeve with said inner ridges has a hardness less than that of said pins so that when said sleeve is reduced in diameter said inner ridges fill spaces between said sleeve and said pins.

2. The optical fiber connector terminal of claim 1, wherein said plurality of pins and said plurality of inner ridges are three pins and three inner ridges, respectively.

3. The optical fiber connector terminal of claim 1, wherein said plurality of pins and said plurality of inner ridges are five pins and five inner ridges.

4. A method of making an optical fiber connector terminal, which comprises the steps of:
providing a plurality of inner ridges on an inside of a sleeve;
placing a plurality of pins within said sleeve such that said pins having a hardness greater than that of said sleeve are disposed around a center of said sleeve;
reducing a diameter of said sleeve so that said inner ridges fill spaces between said sleeve and said pins, thereby disposing said pins equidistance from said center to form a receiving aperture at said center; and
bonding an optical fiber in said receiving aperture to provide an optical fiber connector terminal.

5. The method of claim 4, wherein said plurality of pins and said plurality of ridges are three pins and three ridges.

6. The method of claim 4, wherein said plurality of pins and said plurality of ridges are five pins and five inner ridges.

7. The method of claim 4, wherein said pins are made from hardened stainless steel while said sleeve with said inner ridges is made from stainless steel which is not hardened.

8. The method of claim 4, wherein said diameter reducing step comprises the step of subjecting said sleeve with said inner ridges to a rotary forging process.

9. The method of claim 4, wherein said diameter reducing step comprises the step of subjecting said sleeve with said inner ridges to a drawing process.

10. The method of claim 4, wherein said diameter reducing step comprises the step of subjecting said sleeve with said inner ridges to a press process.

* * * * *